United States Patent [19]
Centner et al.

[11] 3,829,750
[45] Aug. 13, 1974

[54] SELF-ADAPTIVE PROCESS CONTROL

[75] Inventors: Ronald M. Centner, Southfield, Mich.; Robert J. Velek, Brookfield, Wis.

[73] Assignee: The Bendix Corporation, Southfield, Mich.

[22] Filed: Feb. 12, 1971

[21] Appl. No.: 114,773

[52] U.S. Cl............... 318/561, 318/39, 235/151.11
[51] Int. Cl. .......................................... G05b 13/00
[58] Field of Search.............................. 318/561, 39

[56] References Cited
UNITED STATES PATENTS

| | | | |
|---|---|---|---|
| 2,901,927 | 9/1959 | Morgan............................ | 318/39 X |
| 3,343,991 | 9/1967 | Koenig............................ | 318/561 X |
| 3,346,726 | 10/1967 | Rouxel et al................... | 318/561 X |
| 3,389,243 | 6/1968 | Peschon.......................... | 318/561 X |
| 3,435,422 | 3/1969 | Gerhardt et al. ............... | 318/561 X |
| 3,548,172 | 12/1970 | Centner et al.................. | 318/561 X |
| 3,555,252 | 1/1971 | Garden .......................... | 318/561 X |
| 3,629,560 | 12/1971 | Slawson ....................... | 318/561 UX |
| 3,634,664 | 1/1972 | Valek............................. | 318/561 X |
| 3,657,524 | 4/1972 | Bakke............................ | 318/561 X |

Primary Examiner—T. E. Lynch
Attorney, Agent, or Firm—Lester L. Hallacher; Allen M. Krass

[57] ABSTRACT

A control system for a surface grinder includes sensors associated with the machine-workpiece interface operative to generate signals proportional to parameters associated with the machine process such as vibration, temperature and torque. These signals are processed to calculate a figure-of-merit for the operation in terms of metal removal rate and to develop signals which are compared with predetermined constraints on the range of operation. The grinder crossfeed and tablefeed are then modified in accordance with a hill-climbing strategy in order to optimize the figure-of-merit without violating any of the constraints. The actual surface finish of a completed section of the part is sensed by an optical instrument and is compared with a calculated surface finish value derived from the previously measured process parameters and used in connection with the constraint violation and detection. The configuration of the computer which generates the calculated surface finish value from the measured process parameters is adaptably modified in accordance with a hill-climbing strategy in order to train the computer to calculate accurate estimates of the surface finish under varying performance conditions.

3 Claims, 4 Drawing Figures

PATENTED AUG 13 1974

INVENTORS
Ronald M. Centner &
BY Robert J. Valek
Barnard, McGlynn & Reising
ATTORNEYS INVENTORS
Ronald M. Gentner &
BY Robert J. Valek Barnard, McGlynn & Reising
ATTORNEYS

SELF-ADAPTIVE PROCESS CONTROL

BACKGROUND OF THE INVENTION

1. Field of the Invention

This invention relates to control systems for machine tools which adaptively adjust the machines operation as a function of measurements made of parameters associated with machining process, and more particularly, to such adaptive control systems wherein the manner in which the control system adapts as a function of the measured process variables is itself adaptively modified on the basis of measurements of the output of the machining process.

2. Background of the Invention

U.S. Pat. No. 3,548,172, assigned to the assignee of the present invention, discloses a control system for a milling machine which controls the cutter position relative to the workpiece in accordance with input numerical commands and adjusts the feedrate and the spindle speed in an adaptive manner under the control of on-line measurements of the actual machine performance. That system measures the temperature, vibration and torque associated with the cutting operation and provides signals representative of these values and of various preset values to a performance computer which calculates a figure-of-merit for the operation in terms of metal removal rate and also calculates operational parameters which are compared with preset constraints values such as maximum temperature and vibration to determine if the operation is violating any of the constraints. Using the figure-of-merit and the constraint violation signals an optimization computer modifies the feedrate and spindle speed in accordance with an optimizing hill-climbing strategy in a manner calculated to maximize the metal removal rate without violating any of the constraints.

The relationships between the measured processed parameters and the preset inputs which may relate to costs, operating conditions, etc., and the calculated figure-of-merit and operational parameters are usually highly complex, nonlinear, and specifically related to a given process. Accordingly, the problem of determining the manner in which the parameters and inputs should be processed in order to derive the figure-of-merit and operational parameters is quite difficult and was generally done in the past on a relatively emperical basis using data gathered in extensive machine tests.

The validity of the relationship used to calculate the inputs to the optimization computer based on the economic inputs and measured performance parameters is tested by measurements made of the full process and the workpieces formed by the machining operation. For example, the surface finish of a workpiece may be one of the characteristics that is being optimized and a calculated surface finish may be one of the operational parameters or may enter into the calculation of the figure-of-merit. Accordingly, the surface finish of the resultant workpiece may be inspected and based on such measurements the computations used in calculation of the inputs to the optimization computer may be modified.

SUMMARY OF THE PRESENT INVENTION

The present invention contemplates such an adaptive control system wherein the operations performed on the measured process parameters and the input economic data are adjusted in an optimizing manner as a function of the difference between selected characteristics of the process as measured after the completion of at least a portion of the process and the calculated values of these characteristics as computed from the measured process parameters and input variables, and to such a system where the modification is performed in an adaptive manner to train the system to interpret the process measured by the process parameters and input economic data in an appropriate manner over a wide range of process conditions. The concept is implemented by storing certain of the values calculated by the performance computer and comparing these values with measured characteristics of the output such as the surface finish of the completed part. Based on differences between the calculated and measured values the configuration of the performance computer is adjusted. These adjustments are made in an optimizing manner over a period of time to train the configuration of the performance computer.

DESCRIPTION OF THE PREFERRED EMBODIMENT

A preferred embodiment of the present invention, which will subsequently be disclosed in detail, operates to control the crossfeed and tablefeed of a surface grinder in order to optimize the metal removal rate.

The crossfeed and tablefeed signals, as set by manual controls, are modified by an adaptive loop. That loop operates upon the signals from sensors which measure the vibration, torque and speed of the grinding spindle. These signals, as well as signals representative of the current crossfeed and tablefeed values are provided to a performance computer including an analog linear regressing circuit which weights each of the factors by a different amount and sums them to provide a signal intended to be proportional to the surface finish of the workpiece being formed by the grinder. The performance computer includes another circuit which generates a signal proportional to the metal removal rate based on the product of the tablefeed and crossfeed signals. These two outputs as well as the properly conditioned vibration, torque tablefeed, crossfeed and spindle speed signals are provided to an optimization computer. This computer compares the vibration, torque, spindle speed, crossfeed and tablefeed signals with preset constraint values indicative of the maximum and in certain cases the minimum values for these parameters. The optimization computer also generates signals representative of the desired modifications in the crossfeed and tablefeed. These modifications are made in accordance with a hill-climbing strategy which causes the product of the crossfeed and tablefeed to its maximum constraint value. The tablefeed is then gradually increased unless a constraint is violated in which case the tablefeed is reduced slightly until the constraint is eliminated.

In order to train the performance computer to properly operate upon its inputs to generate a calculated surface finish value, a second "training loop receives input from an optical sensor mounted in the grinding head which measures the actual surface finish of a section of the workpiece just completed by the grinder. The training loop also receives the calculated surface finish output of the performance computer and averages the signal over one full tablefeed of the grinding wheel. This signal is then stored until the measured surface finish signal based on that section of the grinding operation is available. The two signals are compared and their difference is used to control the operation of a training circuit which modifies the weights given to each of the factors used to calculate surface finish in the performance computer. These weights are modified in accordance with a hill-climbing strategy with a single one of the weights being adjusted until the optimum is reached and then another of the weights being adjusted.

While in the preferred embodiment of the invention the calculated surface finish is used to determine the existence of a constraint violation, in other embodiments the calculation of a factor employed in the generation of the figure-of-merit might be "trained" by an outer loop. If the figure-of-merit is readily calculable from the measured parameters or the relationship between the measured parameters and the figure-of-merit is a linear one the computer which calculates the surface finish could be easily adjusted to provide the proper result and no training circuit would be needed. The need for the present invention occurs when the relationship between the measured parameters and the inputs required by the optimization computer is a complex one.

Other objects, advantages and applications of the present invention will be made apparent by the following detailed description of a preferred embodiment of the invention. The description makes reference to the accompanying drawings, in which.

Figure 1:
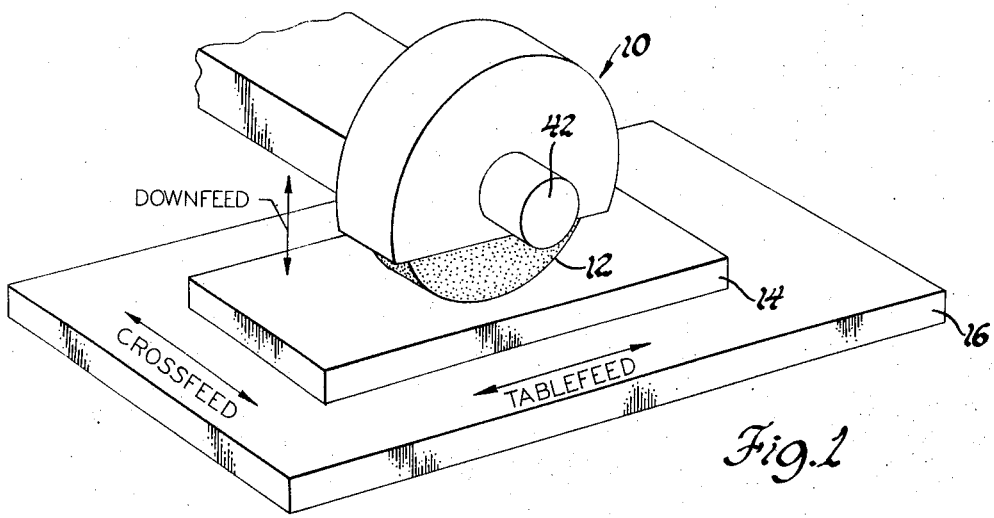
FIG. 1 is a perspective view of the grinding wheel and table of a surface grinder which is controlled by the preferred embodiment of the invention.

Referring first to FIG. 1, the preferred embodiment of the invention operates to control the crossfeed and tablefeed of a surface grinder, generally indicated at 10. The grinder is substantially the conventional variety and has a grinding wheel 12 which is rotatable about a horizontal axis so as to contact a workpiece 14 with its flat peripheral edge. The workpiece is supported on a table 16 forming part of the surface grinder and supported for motion along a pair of mutually perpendicular axes in the horizontal plane. One axis, termed the tablefeed axis, extends normally to the rotational axis of the grinding wheel 12 while the other axis, termed the crossfeed axis extends parallel to the grinding wheel axis. The wheel itself is capable of movement toward and away from the table 16 so as to vary the depth of cut of the wheel on the workpiece 14.

The grinding wheel finishes a flat surface on the workpiece by means of a series of strokes wherein the table 16 is moved relative to the grinding wheel 12, along the tablefeed axis, so as to grind one strip across the length of the workpiece. Following this the table moves in the crossfeed direction so as to bring the grinding wheel into contact with an adjacent overlapping strip. When the entire surface to be ground has been covered by the wheel the down-feed may be adjusted to take another pass at the workpiece.

In connection with the present invention the rate of tablefeed motion and the crossfeed distance between tablefeed strokes may be adjusted in order to control the surface-finish produced on the resultant workpiece. The downfeed between passes and the spindle speed of the grinder are also manually controllable but are not automatically controlled in the practice of the preferred embodiment of the invention.

Figure 2:
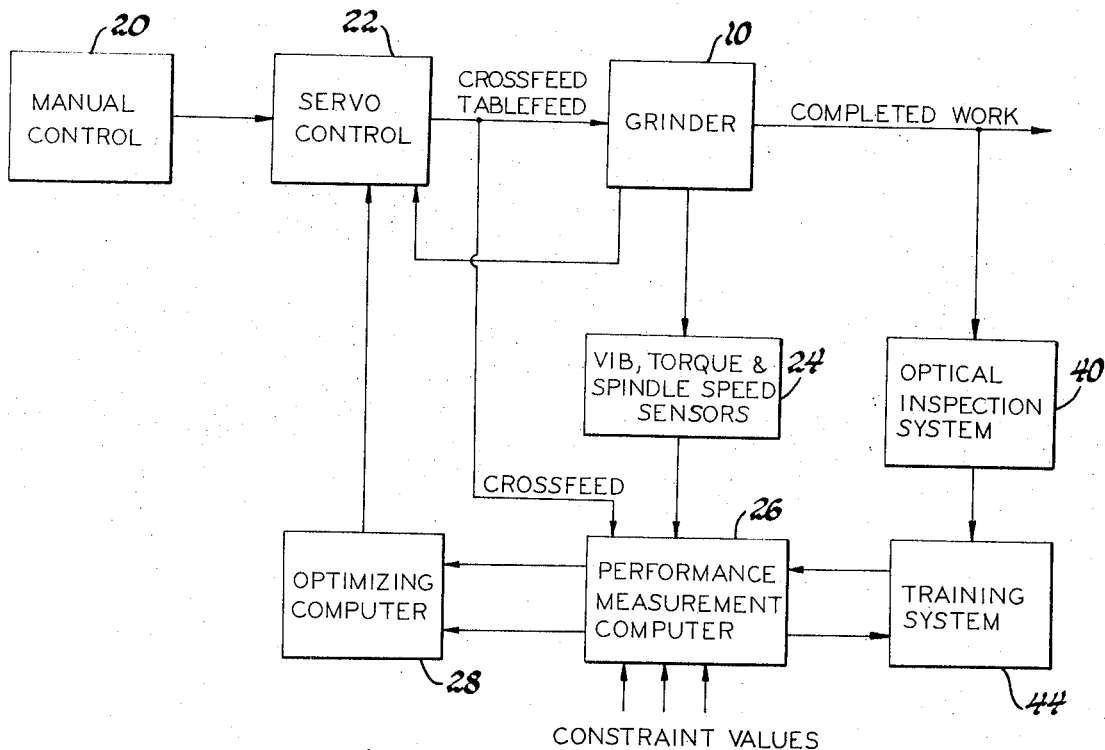
FIG. 2 is a block diagram of an on-line trainable adaptive control system for the grinder of FIG. 1 formed in accordance with the preferred embodiment of the invention.

FIG. 2 illustrates the system including the grinder and the control components in block form. Initial values of tablefeed rate and crossfeed stroke are entered into the system by manual control unit 20. These signals are provided to a servo control unit 22 which also receives feedback information from appropriate transducers associated with the grinder 10 regarding the response of the machine to the values of these controllable input variables.

The servo control acts to modify the control values provided to the grinder as a function of the feedback signals in order to maintain the performance of the grinder at the level set by the manual control signals.

The system also includes a secondary loop or adaptive controller which optimizes an aspect of the process operation, in the case of preferred embodiment, metal removal rate, based on measurements of the performance and pre-established criteria. This adaptive controller includes sensors 24 physically associated with the grinder so as to measure the vibration, torque, and speed of the grinding spindle. The torque is measured by the grinding spindle current, the speed with a tachometer and the vibration with any suitable commercially available sensor. The electrical signals representative of these values are provided to a performance measurement computer 26 which also receives constraint value signals indicating the limits of the range of operation of the system in terms of certain of the measured parameters. The crossfeed and tablefeed signals from the servo control 22 are also provided to the performance measurement computer 26.

The function of the performance measurement computer 26 is to calculate a "figure-of-merit" indicative of the present performance of the system with respect to chosen criteria. In the case of the preferred embodiment the criteria is the metal removal rate of the grinding operation. The figure-of-merit is calculated as a function of the inputs to the computer 26 from the servo control unit 22 and is essentially the product of the crossfeed and tablefeed.

The performance measurement computer 26 also normalizes and preprocesses its inputs from the sensors 24 and the servo control 22 and compares them with the constraint values to determine if any of the operational constraints are being violated.

Part of this proprocessing involves the calculation of a surface-finish index for use in determination of a violation of the surface-finish constraint. This operation will be subsequently described in detail.

The figure-of-merit signal and the signals indicative of any constraint violations are provided to an optimizing computer 28. The optimizing computer provides outputs to the servo control unit 22 which adjust the commanded values of tablefeed and crossfeed in such a way as to attain the maximum possible figure-of-merit without violating any of the constraints. This is essentially a problem in multivariable optimization and any one of the many well known ways of optimizing a process may be employed. For example, see "Ten Ways to Find the Optimum" J. M. Idelson, *Control Engineering*, June, 1960.

The preferred embodiment of the invention uses a hil climbing strategy wherein grinding starts with the values for tablefeed and crossfeed set by the manual control.

The grinding begins at the manually set values for tablefeed and crossfeed. If no constraints are violated the tablefeed is gradually increased to its maximum constraint value. If no constraints are violated throughout the stroke the crossfeed increment is increased prior to the next stroke. During the next stroke the tablefeed is returned to a lower value and is allowed to increase as in the previous stroke. If during the stroke a constraint is violated, tablefeed will be reduced slightly to return to permissible operating conditions. This tablefeed value will then be maintained unless another constraint is violated. At the end of the stroke the same crossfeed increment will again be used. Likewise, the reverse process is followed if the original manually set values are proved to be too high and the system had to be adjusted to lower values of tablefeed and crossfeed. The outputs of the optimizing computer are voltages which are summed with the manually set values.

As has been noted, one of the functions of the performance measurement computer is to calculate an index of the surface finish to be compared with a constraint value for minimum surface finish which constitutes one of the boundaries on the optimization routine of the system. If the calculated surface finish is lower than the preset surface finish constraint a constraint violation signal will be sent to the optimizing computer which will cause it to decrease tablefeed during the stroke until the calculated surface finish meets the minimum surface finish constraint value.

The system as heretofore described is substantially within the state of the previous art and follows the teachings of U.S. Pat. No. 3,548,172. That patent describes an adaptive control system for a numerically controlled milling machine wherein the feedrate and speed of the milling spindle are adaptively controlled to optimize a complex figure-of-merit within preset constraints.

The surface finish of the part will be a function of the vibration, torque, and rotational speed of the spindle as well as the crossfeed and tablefeed control values but the relationship is a complex non-linear one which is not readily calculable on the bases of impurical tests. Accordingly, the present invention resides in the provision of a training loop which measures the surface finish of the completed section of the workpiece and compares that value with the calculated surface finish value which was previously used to control the system to form the measured section of the workpiece. Based on the difference between the two, the configuration of that section of the performance measurement computer which calculates the surface finish is modified in an adaptive, optimizing manner so as to train the performance measurement computer to calculate surface finish accurately over a wide range of operating conditions.

The training loop includes an optical surface finish inspection system 40 which employs an optical sensing unit 42 mounted on the grinder head so as to project over the section of the workpiece just completed by the grinder. The optical inspection system 42 may be of any commercial variety which generates an output signal which constitutes an index of the surface finish of the workpiece. In the preferred embodiment of the invention an optical surface finish measurement system is used designed in accordance with the teachings of H. Tipton and J. I. Roberts "A New Optical Method of Assessing Surface Quality" Conference on Properties and Metrology of Surfaces, Oxford April 1968. This system, which is not shown in the drawings, directs a light beam on the surface being measured and operates upon the reflected light to generate a signal which varies with the surface roughness.

This signal is provided to a training system 44 which also receives a signal from the performance measurement computer 26 containing the value of the calculated surface finish. The training system 44 broadly stores the calculated surface finish signals, and compares them with the actual surface finish measurements which are later made of the section of the part that was ground using the calculated surface finish signal as a part of the control. Based on the differences between the measured surface finish and the previously calculated surface finish, training signals are sent by the system 44 to the performance computer 26 causing the manner in which surface finish is calculated to be changed. These changes are made in an optimized manner using a hill-climbing strategy.

Figure 3:
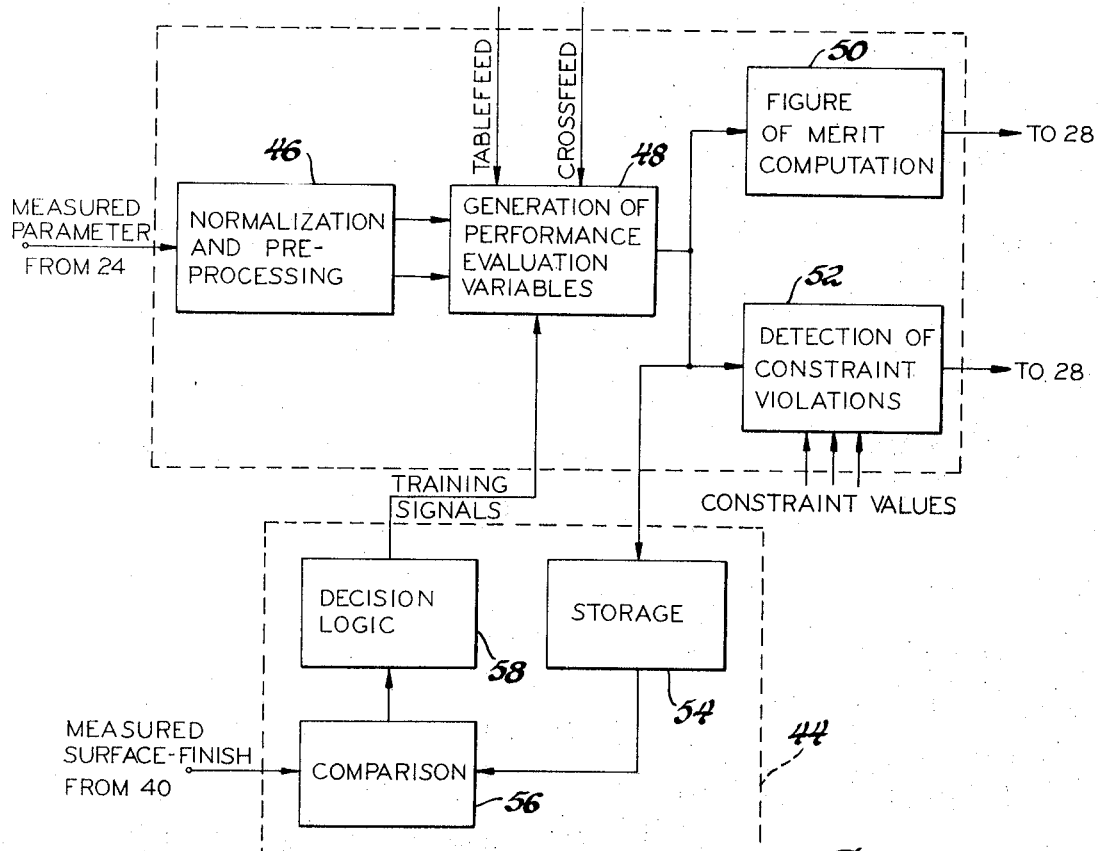
FIG. 3 is a block diagram of performance measuring and training computers which form part of the system of FIG. 2.

FIG. 3 illustrates the performance measurement computer 26, the training system 44, and their interconnections, in greater detail. The vibration, torque and speed signals from the sensors 24 are applied to a normalization and preprocessing system 46 which adjusts the signal to the proper form and level for use by the system. The processed signals along with the tablefeed and crossfeed signals from the servo control 22 are provided to a unit 48 which uses its inputs to compute certain performance evaluation variables such as the surface finish index. Certain of the outputs of the unit 48 are provided to unit 50 which performs the figure-of-merit computation which is essentially the multiplication of the properly processed tablefeed and crossfeed signals. Others of the signals are provided to a constrain violation detection circuit 52 which also receives the constrain values. The unit 52 is essentially a comparison device and its output indicates whether any of the constrained values are being violated by the current mode of operation of the system.

The performance evaluation variable generator 48 also provides the computed index of surface finish to a storage unit 54 contained within the training system 44. At an appropriate time in the operational cycle this computed surface finish value is provided to a comparison unit 56 which also receives the actual part measurements from the optical inspection unit 40. The storage unit 54 effectively delays the computed surface finish signal until an actual measurement has been made of the surface finish of the section of the workpiece which was formed at the time the computed surface finish signal was calculated. In the preferred embodiment of this system the storage time is typically the time required for one table feed stroke. That is, the optical inspection unit 40 measures the surface finish produced on the part by one table feed stroke while the next stroke is being formed. The storage unit 54 also averages the computed surface finish signal for one full stroke so as to make a valid comparison with the actual measurement.

The comparison unit 56 provides a signal to the decision logic unit 58 which is a function of the difference between the stored and averaged computed surface finish and the surface finish measured by the optical system 40. This difference signal is actually a figure-of-merit of the operation of computing the surface finish and, based on this difference, signals are provided by the decision logic unit 58 to the performance evaluation variable generator 48 causing the manner in which surface finish is computed to be modified. This modification is made in an optimizing manner again employing a hill-climbing strategy.

Figure 4:
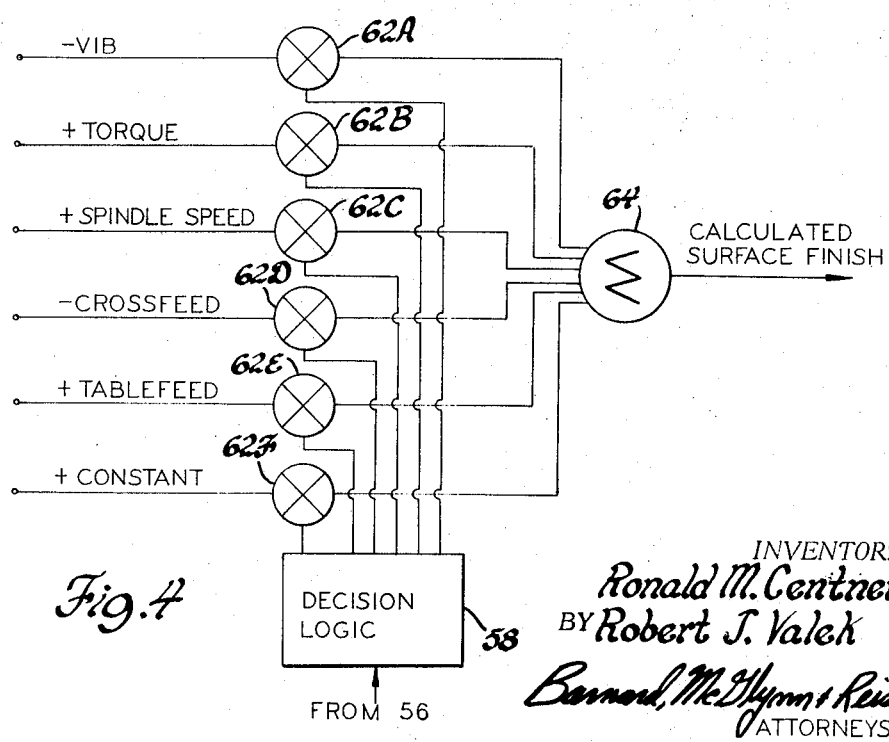
FIG. 4 is a partially block, partially schematic diagram of certain portions of the computers of FIG. 3.

FIG. 4 schematically illustrates that portion of the performance evaluation variable generator 48 which calculates the surface finish and its interconnection with the decision logic 58. The surface finish index is calculated by a linear regression circuit generally indicated at 60. The circuit contains a series of analog multipliers 62a, 62b, 62c, 62d, 62e and 62f. These multipliers each have as one of their inputs a different one of the quantities which go into the calculation of the surface finish and as their second a line from the decision logic unit 58. The outputs of these multipliers are summed by unit 64 to generate the actual calculated surface finish.

One of the inputs to the multiplier 62 is a negative voltage proportional to the vibration of the spindle. The voltage is negative since the calculated surface finish in an inverse function of vibration. One input to the multiplier 62b is a positive voltage proportional to the spindle torque. This voltage is positive since the calculated surface finish is directly proportional to the torque. Similarly, a positive voltage proportional to spindle speed is applied to multiplier 62c; a negative voltage proportional to crossfeed is provided to multiplier 62d and a positive voltage proportional to tablefeed is provided to multiplier 62e. The multiplier 62f receives a constant positive voltage.

Based on the outputs of the comparison unit 56, the decision logic unit 58 modifies the second inputs to each of the multipliers 62 in such a manner as to train the linear regression network to properly calculate the surface finish index over a wide range of operational conditions. The technique used is an optimizing one, preferably of the hill-climbing variety, although any of the known optimizing strategies can be effectively employed. The strategy used to modify a single one of the multiplier voltages and note the resulting effect on the surface finish. If the modification tended to decrease the difference between the calculated surface finish and the measured surface finish then a second modification is made of that multiplier voltage in the same direction. If the initial modification tended to increase the difference between the calculated and measured surface finishes, the voltage applied to that multiplier is modified in the opposite direction. This process continues until the point is found in which modifications in both directions tend to increase the difference between calculated and measured surface finishes. This is considered to be the peak point in the process with regard to that variable and then the process is repeated using the next multiplier. This process is a continuous one but operates at a relatively slow time-scale relative to the grinding process in order to minimize the effect of other process variables on the determination.

The functions of the decision logic 58 and the optimizing computer 28 are preferably performed by a suitably programmed general purpose digital computer associated with appropriate interface units. In other embodiments of the invention the function of units 26 could also be implemented with a suitably programmed general purpose computer or appropriate special purpose computers.

Having thus described our invention we claim:

1. A control system for a machine which operates upon a workpiece comprising: means for generating nominal values of controllable input variables for said machine; an adaptive loop including sensors disposed to monitor operation of the machining process, means for operating upon the outputs of said sensors in order to generate performance evaluation variables including an index of the surface finish of the workpiece, and means for modifying said nominal value so as to maximize said performance evaluation variables, said last said means for modifying being operative to receive a plurality of signals relating to constraint values for performance evaluation variables and including means for comparing said values with the generated performance evaluation variables; and a training loop including means for measuring of the means for measuring the workpiece finish with the index of surface finish, and means for modifying the manner of generation of said performance evaluation variables in an optimizing manner so as to decrease the difference between the output of the means for measuring the workpiece finish and said index of the surface finish of the workpiece.

2. The control system of claim 1 wherein said means for generating said modification signals acts in accordance with a hill-climbing strategy so as to decrease the difference between the output of the means for measuring the workpiece and said one performance evaluation variable.

3. A control system for a machine tool which operates upon a workpiece comprising: means for generating nominal values of controllable input variables for said machine; an adaptive loop including sensors disposed to monitor operation of the machining process, computer means for receiving the outputs of the sensors and calculating a performance evaluation variable relating to surface finish, and means for modifying said nominal value so as to maximize the performance evaluation variable relating to surface finish; and a training loop including means for measuring a machined workpiece finish and for modifying the operation of said computer in accordance with an optimizing strategy as a function of the difference between said measured workpiece finish and said performance evaluation variable relating to surface finish so as to train the system to calculate the performance evaluation variable relating to surface finish.

* * * * *

UNITED STATES PATENT OFFICE
CERTIFICATE OF CORRECTION

Patent No. 3,829,750          Dated August 13, 1974

Inventor(s) Ronald M. Centner and Robert J. Valek

It is certified that error appears in the above-identified patent and that said Letters Patent are hereby corrected as shown below:

Column 5:

Line 4: Change "hil" to ---hill---.

Column 8:

Line 29: After "measuring" (first occurrence), insert ---the machined workpiece finish, means for comparing the output---.

Signed and sealed this 19th day of November 1974.

(SEAL)
Attest:

McCOY M. GIBSON JR.          C. MARSHALL DANN
Attesting Officer            Commissioner of Patents